United States Patent [19]

Liljedahl

[11] Patent Number: 4,770,587

[45] Date of Patent: Sep. 13, 1988

[54] LOCKING PIN

[76] Inventor: Gunnar Liljedahl, Alvik 7555, Lulea, Sweden, 951 90

[21] Appl. No.: 935,138

[22] Filed: Nov. 28, 1986

Related U.S. Application Data

[63] Continuation of Ser. No. 696,111, Jan. 29, 1985, abandoned.

[30] Foreign Application Priority Data

Feb. 8, 1984 [SE] Sweden .................... 8400655

[51] Int. Cl.$^4$ .................... F16B 15/00
[52] U.S. Cl. .................... 411/357; 411/356; 411/516; 403/409.1
[58] Field of Search ............ 411/451, 516, 351, 356, 411/357, 500; 403/379, 324, 154, 409.1

[56] References Cited

U.S. PATENT DOCUMENTS

| | | | |
|---|---|---|---|
| 2,047,295 | 7/1936 | Sipos | 411/516 |
| 2,129,420 | 9/1938 | Guy | 411/516 |
| 2,370,171 | 2/1945 | Jepson | 411/516 |
| 2,651,390 | 9/1953 | Polanin | 403/379 X |
| 3,022,586 | 2/1962 | Towne | 411/516 X |
| 3,025,619 | 3/1962 | Towne | 411/352 X |
| 3,175,314 | 3/1965 | Williamson | 403/379 X |
| 3,494,245 | 2/1970 | Helton | 411/548 |
| 3,520,224 | 7/1970 | Hensley | 403/379 X |
| 3,685,178 | 8/1972 | Ratkowski | 411/516 X |
| 4,192,089 | 3/1980 | Schwappach | 411/357 X |

Primary Examiner—Gary L. Smith
Assistant Examiner—Curtis B. Brueske
Attorney, Agent, or Firm—Holman & Stern

[57] ABSTRACT

A locking pin formed from an elastic material having in its longitudinal direction a symmetrical cross-sectional configuration having two opposite outlines (3,5), one of which (3) is formed by two straight lines extending from the ends of the pin and meeting between the ends to form an obtuse angle and a peak height (12) measured from an opposite straight line (13), which connects two end points of the second outline of the locking pin, the peak height (12) being larger than the diameter of the bore (14), into which the locking pin is to be inserted. The thickness of the pin at any point is less than the diameter of the bore, whereby the end points are positioned on a shoulder (6,7), which is formed at each end of the pin.

2 Claims, 1 Drawing Sheet

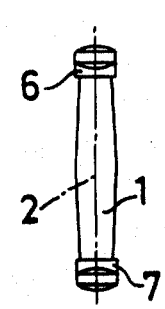
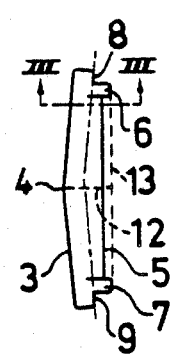
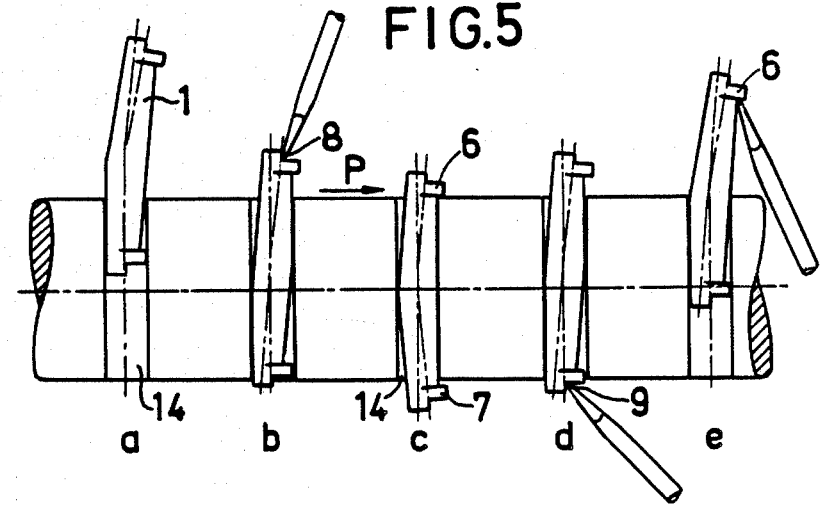

LOCKING PIN

This is a continuation of application Ser. No. 696,111, filed Jan. 29, 1985, now abandoned.

BACKGROUND OF THE INVENTION

1. Field of the Invention

The present invention relates to a locking pin insertable into a longitudinal bore so that at least one end of the locking pin projects outside the orifice of the bore, which pin is formed from an elastic material and in its longitudinal direction has a symmetry plane, the section of which through the pin forms two opposite outlines, one of which bends outwardly and has a peak height measured from an opposite straight line, which connects two end points of the second outline of the locking pin, said peak height being larger than the diameter of said bore into which the locking pin is to be inserted, but the thickness of the locking pin overall is less than the diameter of the bore, and at least one of said end points being placed on the end portion of a shoulder, which is formed at the end of the pin.

2. Description of the Prior Art

Locking pins of the kind described above are usually so called split pins. Split pins have an eye or another enlargement in one end preventing the split pin from passing through the bore and the split pin is locked against returning out of the bore by the split end being bent aside. Split pins are used for locking nuts on screws or to form axial stops by means of a washer or a sleeve, which is placed around the shaft. Locking pins of this kind are thus inserted into a bore so that the pin and the bore together form the axial lock. Known locking pins are impaired by the disadvantage that they usually can be used only once and most often they do not form a distinct fixation of position for the locking of the shaft that the pin is intended to perform.

BRIEF SUMMARY OF THE INVENTION

The object of the invention is a locking pin which can be used again and again and to provide is simple to assemble and remove by means of a screwdriver or a similar tool. It also has a fixed position in a direction perpendicular to the bore into which the pin is inserted.

The invention is characterized in that the locking pin has a rounded cross section form, the bent-out outline consists of two straight lines having a peak between the two end portions of the pin, and the second outline has a straight part between two shoulders one at each end of the pin, which straight part of said second outline has a length which at least corresponds to the length of the bore, into which the pin is to be inserted, whereby the diameter of the pin measured at said peak and close to the shoulder is somewhat less than the diameter of the bore.

BRIEF DESCRIPTION OF THE DRAWINGS

An embodiment of the invention will now be described in detail accompanying with reference to the attached drawings wherein:

FIG. 1 is a side elevational view of a locking pin according to the invention;

FIG. 2 is a left side view of the locking pin of FIG. 1;

FIG. 3 is a transverse cross-sectional view taken along line III—III in FIG. 2;

FIG. 4 is an end view of the pin as shwn in FIG. 2; and

FIG. 5 is a schematic view which shows in two steps how the locking pin is inserted into its position in a bore through a shaft, the pin in its locking position and, in two steps, how the locking pin is removed from the bore.

DETAILED DESCRIPTION

Referring to FIGS. 1-4 there is shown an embodiment of the invention, which will now be described. The pin 1 is made of metal or plastic, but preferably from metal, which has some elastic properties allowing the pin to be bent and resume its original shape. The elastic quality should be such that the pin can be bent by hand. The pin 1 is shown from one side in FIG. 1 and the side view in FIG. 2 is turned 90° relative to the view according to FIG. 1. The pin 1 has a symmetry plane 2 according to FIG. 1 and the form of the symmetry plane is shown in FIG. 2. From FIG. 2 can be seen the outlines of the pin in the symmetry plane. As can be seen the left outline 3 is bent outwardly with a peak 4 in the middle. The outline 3 is composed by straight lines but may be of a different form e.g. the form of a curve. The outline 5 opposite the outline 3 is a straight line between two shoulders 6 and 7, which shoulders are arranged at the end portions of the pin, respectively. The shoulders project beyond the outer face of the pin in a direction opposite the outline 3. The pin is extended lengthwise beyond the shoulders 6 and 7 forming the gripping edge 8 and 9, respectively.

The object of the locking pin is that it should be insertable into a bore, which is transverse to e.g. a shaft. The distance between the two shoulders 6 and 7 should correspond to the approximate length of the bore and the shouldeers 6 and 7 should abut the end edges of the bore. The pin is rounded and has a circular shape near the shoulders 6 and 7, see FIGS. 3 and 4. The diameter 10 of the shoulders 6 and 7, respectively, corresponds to the diameter of the bore into which the pin is to be inserted. The diameter 10 must not be larger, because if it were the pin could not be inserted through the bore. The diameter of the pin at the peak 4 also must not be larger than the diameter of the bore. On the other hand, the diameter must be large enough so that the peak height 12 between the outline 3 and the line 13, connecting the outer end portions of the shoulder 6 and 7, is larger than the diameter of the bore into which the pin is to be inserted. If not, the locking pin would run through the bore without the shoulders 6 and 7 engaging the end edges of the bore.

FIG. 5 illustrates how the locking pin is inserted into the locking position in the bore of a shaft and also how the locking pin is taken out of the bore. The position a thus shows the locking pin being half-way into the bore 14 having one of the shoulders inside the bore. In position b the locking pin is shown almost completely inserted into the bore and it is apparent that the pin has bent so that the outline 3 is somewhat straightened out, while on the other hand the second outline 5 is being bent. The position c shows the locking pin in its locking position having the shoulders 6 and 7 abutting the end edges of the bore 14 and the locking pin cannot be taken out of the bore 14 without being bent backwards or being otherwise deformed. The position d shows how the pin is taken out of the bore by means of a screwdriver or the like, which pushes the lower end of the pin to the left so that the shoulder 7 is freed from the edge of the bore and the pin can be moved upwards with the shoulder 7 sliding against the inner side of the bore. The position e shows the locking pin being moved half-way out of the bore 14 and that a screwdriver may be used to engage the upper shoulder 6 and thereby, push the locking pin the remaining way out of the bore 14. It appears from FIG. 5 that, when inserting or pushing the pin out the screwdriver is preferably pressed against the gripping edges 8 and 9, respectively.

The locking pin according to the invention has very good locking qualities against axial forces along the direction of the shaft, into the bore of which the pin is inserted. It should be noted that the shoulders 6 and 7 are turned in a direction away from the one towards which the outline of the pin is bulging. This means that if an axial force should happen to bear against the shoulders, the locking pin will turn in the bore at least 90° meaning that the shoulders will not be moved in the longitudinal direction of the shaft, which might bend the locking pin and cause the pin to slip out of the bore if the shoulders are freed from their engagement with the edges of the bore. The locking pin thus has a well fixed position in the bore even if forces along the shaft should try to bend the pin so that the shoulders are freed. Normally the locking pin thus shall lock against axial forces having the direction marked with the arrow P in FIG. 5, but a safe locking is also achieved in the opposite axial direction, whereby the locking pin can turn in the bore 14 or stay in its original position when the turning force does not overcome the friction forces derived from the turning of the pin in the bore.

I claim:

1. In a re-usable elongated locking pin insertable into a longitudinal bore through a member whereby at least one end of the locking pin projects outside the orifice of the bore, the locking pin being formed from an elastic material and having a symmetrical longitudinal cross-sectional configuration having two opposite outlines, one of which is in part a straight line, the greatest diametral distance between the other outline and an opposite straight line connecting points adjacent the ends of the straight line outline being larger than the diameter of the bore into which the pin is inserted, and the width of the transverse cross-section at any point of the locking pin being less than the diameter of the bore, the improvement wherein:

said locking pin is substantially straight and has a rounded transverse cross-sectional form;

said other outline is formed by two straight lines extending from the opposite ends of said locking pin toward the middle portion thereof and meeting between said ends to form an obtuse angle forming a peak in said other outline at the greatest diametral distance between said outlines;

the locking pin has an outer surface configuration extending parially around said pin on the side containing said other outline which tapers inwardly from said middle portion toward said ends so that the diameter of the locking pin varies along the length thereof;

a protruding member is provided adjacent each end of said locking pin protruding substantially radially in a direction oppositely with respect to said other outline and having a part-circular peripheral configuration forming a retaining shoulder at each end of said locking pin, said retaining shoulders having surfaces facing each other and being spaced a distance at least as great as the length of the bore; and said straight line outline extends between said facing surfaces.

2. In an assembly of a shaft and a re-usable locking pin therefor, the locking pin being insertable into a bore through the shaft with at least one end of the pin projecting outside the bore, the locking pin being formed from an elastic material and having a symmetrical longitudinal cross-sectional configuration having two opposite outlines, one of which is in part a straight line, the greatest diametral distance between the other outline and an opposite straight line connecting points near the ends of the straight line outline part being larger than the diameter of said bore, and the width of the transverse cross-section at any point of the locking pin being less than the diameter of the bore, the improvement comprising:

a transverse bore extending through the shaft;

said locking pin having a rounded transverse cross-sectional form;

said other outline being formed by two straight lines extending from the opposite ends of said locking pin toward the middle portion thereof and meeting at said middle portion to form an obtuse angle forming a peak in said other outline at the greatest diametral distance between said outlines;

the locking pin having an outer surface configuration extending partially around said pin on the side containing said other outline which tapers inwardly from said middle portion toward said ends so that the diameter of the locking pin varies along the length thereof;

a protruding member adjacent each of said locking pin protruding substantially radially from the locking pin in a direction oppositely with respect to said other outline and having a part-circular peripheral configuration, each protruding member forming a retaining shoulder having a substantially flat face thereon facing toward the middle portion of the locking pin and extending substantially perpendicular to the longitudinal axis of the pin, said faces being spaced a distance apart at least as great as the length of said bore; and said straight line outline extending between said faces.

* * * * *